(12) United States Patent
Chari et al.

(10) Patent No.: US 7,877,416 B2
(45) Date of Patent: *Jan. 25, 2011

(54) SYSTEM AND PROGRAM PRODUCT FOR DISPLAYING A LOGICAL STRUCTURE

(75) Inventors: Srinivas Chari, Toronto (CA); Crystal J. Su, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 435 days.

This patent is subject to a terminal disclaimer.

(21) Appl. No.: 12/118,155

(22) Filed: May 9, 2008

(65) Prior Publication Data

US 2008/0288514 A1 Nov. 20, 2008

Related U.S. Application Data

(63) Continuation of application No. 10/932,676, filed on Sep. 2, 2004, now Pat. No. 7,389,296.

(51) Int. Cl.
G06F 7/00 (2006.01)
G06F 17/30 (2006.01)

(52) U.S. Cl. ........................ 707/795; 707/800; 707/802; 707/803; 707/829

(58) Field of Classification Search .................. 707/795
See application file for complete search history.

(56) References Cited

U.S. PATENT DOCUMENTS 5,546,571 A 8/1996 Shan et al.
5,923,328 A * 7/1999 Griesmer ..................... 715/854
5,926,823 A * 7/1999 Okumura et al. ............ 715/236
5,935,210 A * 8/1999 Stark .......................... 709/224
6,064,814 A 5/2000 Capriles et al.
6,513,154 B1 1/2003 Porterfield
2004/0060006 A1* 3/2004 Lindblad et al. ............ 715/513

OTHER PUBLICATIONS

Grove et al., "A Framework for Call Graph Construction Algorithms", ACM Transactions on Programming Languages and Systems, vol. 23, No. 6, Nov. 2001, pp. 685-746.
Gupta et al., "Parallel Execution of Prolog Programs: a Survey", ACM Transactions on Programming Languages and Systems, vol. 23, No. 4, Jul. 2001, pp. 472-602.
Schwartz, Randal L., "Parallel User Agents for Link Checking", Web Techniques, pp. 28-33, Jul. 1998.
Vitter, Jeffrey Scott, "External Memory Algorithms and Data Structures: Dealing with Massive Data", ACM Computing Surveys, vol. 33, No. 2, Jun. 2001, pp. 209-271.

* cited by examiner

Primary Examiner—Don Wong
Assistant Examiner—Binh V Ho

(57) ABSTRACT

The present invention provides a methodology for truncating a logical structure having data matching a predefined pattern. For example, the present invention truncates a logical structure so that branches of the structure are automatically ceased at a recursive ancestor instead of at a descendant. By using the methodology of the present invention, the total number of nodes of the logical structure that will be automatically displayed for a user is represented by the formula N*N+1. Thus, when N=10, the total number of nodes that are automatically displayed for the user is 101. This quantity is far more user friendly than the 9,864,101 nodes that would be displayed when N=10 under previous approaches.

8 Claims, 5 Drawing Sheets

PRIOR ART

PRIOR ART

SYSTEM AND PROGRAM PRODUCT FOR DISPLAYING A LOGICAL STRUCTURE

REFERENCE TO PRIOR APPLICATIONS

This application is a continuation application of U.S. patent application Ser. No. 10/932,676, filed on Sep. 2, 2004, now U.S. Pat. No. 7,389,296, which is hereby incorporated by reference.

BACKGROUND OF THE INVENTION

1. Field of the Invention

In general, the present invention provides a system and program product for displaying a logical structure. Specifically, the present invention provides a way to display a logical structure of nodes without repeatedly displaying particular patterns of nodes such as recursive hierarchical descendants.

2. Related Art

The manipulation of data has become an important and valuable tool in business success. By successfully mining data a company can both plan for growth and identify loss areas. To this extent, various software programs have been developed for performing data manipulation and mining. One such program is WebSphere Business Integrator Brokers version 5 ("WBI") Toolkit, which is commercially available from International Business Machines Corp. of Armonk, N.Y.

Many of these programs include mapping components that allow a user to visualize relationships among data items. Typically, the mapping components will graphically depict data item relationships in a logical structure of nodes such as a hierarchical tree or the like. Some programs allow the logical structure to be displayed to the user fully expanded. Conversely, other programs will display the logical structure with a certain/predetermined level of expansion that can be manually adjusted by the user to hide or reveal additional nodes (e.g., by expanding or contracting branches of the structure). Where manual expansion is provided, many programs allow a user to quickly expand or contract the entire structure by invoking an "expand all" or "contract all" action.

In cases where there is no recursiveness among data items, providing a visual representation can be a fairly easy task to perform since the logical structure will be finite. For example, the following is an example of a logical structure whose data items have no recursiveness:

```
InsurancePolicy
   |-- StartDate
   |-- EndDate
   +-- PolicyNumber
```

With data items such as these, the logical structure can be easily built and will be finite. However, when a logical structure contains recursively cross-referenced data items, full expansion of the structure is impossible since the structure will be infinite. The following is an example of a logical structure whose data items are recursive:

```
ManufacturedItem
   |-- ManufacturedItem (*)
   +-- MotorizedVehicle
       +-- Structure
           +-- ManufacturedItem (*)
```

With data item relationships such as these, single-level expansion in the corresponding logical structure is one approach that has been attempted. Unfortunately, if the user is interested in a node that is deep in the logical structure, too many manual expansions could be required.

This problem is especially apparent in XML Schemas, which usually have deep hierarchies and often contain recursive structures. In this and similar cases, users would often prefer for the program to automatically expand the structure for display so that they can use the node of interest to them without having to perform too many single level expansions.

Along these lines, consider the IAA industry standard XML Schema as an example. In this example, there are elements that refer to each other via "containment." For instance, a garage is a structure that can contain structures, manufactured items and motorized vehicles. All of these contain physical objects and are themselves physical objects. A motorized vehicle is a manufactured item, and also contains other manufactured items and physical objects. A manufactured item can "contain" a motorized vehicle, a garage (which is manufactured) and physical objects among other things. All these relationships are logically sound at the schema level. However, at the instance level, this does not apply. In such cases, a way to expand the structure as deep as possible while trimming at some point to avoid recursion is needed.

In one existing methodology, expansion is ceased when one complete loop is displayed. Specifically, the algorithm used in WBI displays all children of any item, until a hierarchical descendent item either does not have children, or repeats one of its own ancestors. Thus, assuming a logical structure of N items with each item having N items as its children, the total number of nodes that will be displayed for a user who can then perform manual manipulations is defined by the following formula:

$$f(N) = 1 + \sum_{i=1}^{N-1} \frac{N!}{i!}$$

The concept of stopping expansion at the child/descendant level provided by this formula may work well when the number of the data items involved in the recursive chain is small and if there is only one recursive chain (e.g., such as in the above example). For example, under the above formula, if N=2 a total of 5 nodes will be displayed. However, if there is a significant number of data items involved in the recursive chain, and the data items are heavily cross-referenced (branching off into other recursive chains), then even building a logical structure that stops at a first repeating descendent requires a large amount of memory from an application. For example, if N=10 a total of 9,864,101 nodes will be automatically displayed for the user.

In view of the foregoing, there exists a need for an improved way to truncate or automatically render a logical structure having data matching a predefined pattern. For example, a need exists for a system and program product for displaying a logical structure having a high number of recursive data items that are heavily cross-referenced.

SUMMARY OF THE INVENTION

In general, the present invention provides a system and program product for displaying a logical structure. Specifically, the present invention provides a methodology for truncating a logical structure having data matching a predefined pattern. For example, the present invention truncates a logical structure so that branches of the structure are automatically ceased at a recursive ancestor instead of at a descendant. By using the methodology of the present invention, the total number of nodes of the logical structure that will be automatically displayed for a user is represented by the formula N*N+1. Thus, when N=10, the total number of nodes that are automatically displayed for the user is 101. This quantity is far more user friendly than the 9,864,101 nodes that would be displayed when N=10 under previous approaches.

A first aspect of the present invention provides a system for displaying a logical structure, comprising: a pattern recognition system for examining a set of data items to identify a predefined pattern; a list generation system for adding particular nodes corresponding to the set of data items to a list based on the predefined pattern; and a structure generation system for generating a logical structure of nodes for display based on the list, wherein hierarchical descendants of the particular nodes in the list will be automatically displayed only a single time.

A second aspect of the present invention provides a program product stored on a recordable medium for displaying a logical structure, which when executed, comprises: program code for examining a set of data items to identify a predefined pattern; program code for adding particular nodes corresponding to the set of data items to a list based on the predefined pattern; and program code for generating a logical structure of nodes for display based on the list, wherein hierarchical descendants of the particular nodes in the list will be automatically displayed only a single time.

A third aspect of the present invention provides a system for deploying an application for displaying a logical structure, comprising: a computer infrastructure being operable to: examine a set of data items to identify a predefined pattern; add particular nodes corresponding to the set of data items to a list based on the predefined pattern; and generate a logical structure of nodes for display based on the list, wherein hierarchical descendants of the particular nodes in the list will be automatically displayed only a single time.

A fourth aspect of the present invention provides computer software embodied in a propagated signal for displaying a logical structure, the computer software comprising instructions to cause a computer system to perform the following functions: examine a set of data items to identify a predefined pattern; add particular nodes corresponding to the set of data items to a list based on the predefined pattern; and generate a logical structure of nodes for display based on the list, wherein hierarchical descendants of the particular nodes in the list will be automatically displayed only a single time.

Therefore, the present invention provides a system and program product for displaying a logical structure.

BRIEF DESCRIPTION OF THE DRAWINGS

These and other features of this invention will be more readily understood from the following detailed description of the various aspects of the invention taken in conjunction with the accompanying drawings in which.

Figure 1:
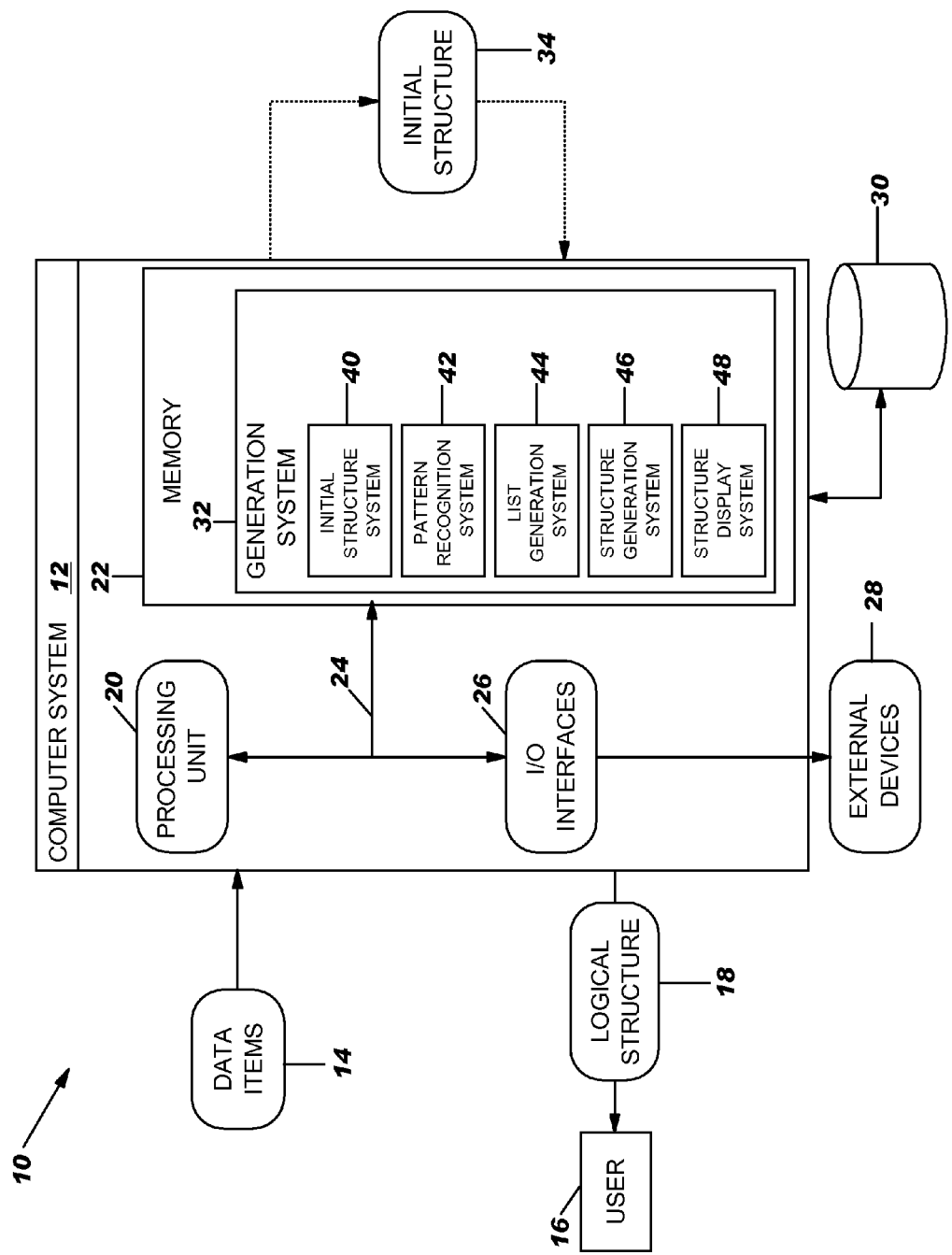
FIG. 1 depicts a system for displaying a logical structure according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DESCRIPTION OF THE INVENTION

As indicated above, the present invention provides a system and program product for displaying a logical structure. Specifically, the present invention provides a methodology for truncating a logical structure having data matching a predefined pattern. For example, the present invention truncates a logical structure so that branches of the structure are automatically ceased at a recursive ancestor instead of at a descendant. By using the methodology of the present invention, the total number of nodes of the logical structure that will be automatically displayed for a user is represented by the formula N*N+1. Thus, when N=10, the total number of nodes that are automatically displayed for the user is 101. This quantity is far more user friendly than the 9,864,101 nodes that would be displayed when N=10 under previous approaches.

Instead of building a logical (e.g., tree) structure that stops at a descendent that repeats one of its own ancestor such as with related methods, the present invention will stop showing hierarchical descendants (e.g., children) of any data item or node known to have hierarchical descendants matching the predefined pattern (for instance, a recursive pattern). One type of predefined pattern to which the present invention can be applied is recursion. That is, if a data item is involved in a recursive relationship, the present invention will only show that recursive relationship once. Then, for any data item involved in a recursive relationship elsewhere in the logical structure, the present invention will stop building the branch at the recursive ancestor, instead of stopping at the recursive descendent. Thereafter, the user is free to manually manipulate the logical structure to access the data items or nodes he/she so desires. The teachings of the present invention will thus reduce the memory requirement for a logical structure from an order of N factorial (N!) (as required by related methods) to an order of N squared ($N^2$) for a recursive pattern. It should be appreciated in advance that although a particular methodology and formula will be expressed below with respect to a recursive pattern, similar teachings could be applied to any predefined pattern (although the formula may change).

Referring now to FIG. 1, a system 10 for displaying a logical structure 18 to a user 16 (or to a group of users) according to the present invention is shown. In general, logical structure 18 is a graphical representation of data items 14. To this extent, logical structure 18 is comprised of a hierarchy of nodes that each correspond to one data item. In a typically embodiment, the present invention is especially useful in providing user 16 with logical structure 18 that is useable and efficiently navigable when the corresponding data items 14 are recursive and high cross-referenced. However, it should also be understood that the teachings of the present invention could be used to provide a useable and efficiently navigable logical structure that is based on non-recursive and non-cross-referenced data items.

In general, the present invention could be implemented on a stand-alone computer system 12 that is accessed directly by user 16 (as shown), or over a network such as the Internet, a local area network (LAN), a wide area network (WAN), a virtual private network (VPN), etc. In the case of the latter, user 16 could operate a separate user computer system (not shown) that communicates with computer system 12 via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional IP-based protocol.

Regardless, computer system 12 (and any user computer system that might be implemented) could be any type of computerized system capable of carrying out the teachings of the present invention. For example, computer system 12 could be a desktop computer, laptop computer, a workstation, a server, a handheld device, etc. It should also be appreciated that irrespective of whether a separate user computer system is implemented, logical structure 18 can be displayed for user 16 on a computer monitor, television, video display, or the like.

As depicted, computer system 12 generally processing unit 20, memory 22, bus 24, input/output (I/O) interfaces 26, external devices/resources 28 and storage unit 30. Processing unit 20 may comprise a single processing unit, or be distributed across one or more processing units in one or more locations, e.g., on a client and server. Memory 22 may comprise any known type of data storage and/or transmission media, including magnetic media, optical media, random access memory (RAM), read-only memory (ROM), a data cache, a data object, etc. Moreover, similar to processing unit 20, memory 22 may reside at a single physical location, comprising one or more types of data storage, or be distributed across a plurality of physical systems in various forms.

I/O interfaces 26 may comprise any system for exchanging information to/from an external source. External devices/resources 28 may comprise any known type of external device, including speakers, a CRT, LED screen, hand-held device, keyboard, mouse, voice recognition system, speech output system, printer, monitor/display, facsimile, pager, etc. Bus 24 provides a communication link between each of the components in computer system 12 and likewise may comprise any known type of transmission link, including electrical, optical, wireless, etc.

Storage unit 30 can be any system (e.g., a database, etc.) capable of providing storage for information under the present invention. Such information could include, among other things, data items 14, an initial logical structure 34, logical structure 18, predefined patterns, an algorithm for modifying initial logical structure 34 to yield logical structure 18, etc. As such, storage unit 30 could include one or more storage devices, such as a magnetic disk drive or an optical disk drive. In another embodiment, storage unit 30 includes data distributed across, for example, a local area network (LAN), wide area network (WAN) or a storage area network (SAN) (not shown). Although not shown, additional components, such as cache memory, communication systems, system software, etc., may be incorporated into computer system 12. Moreover, in the event a separate user computer system is implemented, the user computer system will likely include computerized components similar to computer system 12.

Shown in memory 22 as a program product is generation system 32, which includes (optional) initial structure system 40, pattern recognition system 42, list generation system 44, structure generation system 46 and structure display system 48. In an illustrative embodiment, data items 14 (e.g., recursive and highly cross-referenced) are provided to computer system 12 (e.g., by user 16, an administrator or the like). Upon receipt, initial structure system 40 can optionally construct an initial logical structure 34 of nodes based on data items 14. If generated, initial logical structure 34 is constructed so that each data item 14 is represented by one node. Moreover, as will be further described below, the initial logical structure 34 is not displayed for user 16. Rather, it will be modified according to the methodology of the present invention into a more useable and efficiently navigable logical structure 18 for display. Accordingly, because the initial logical structure 34 will be generated "behind the scenes" from user 16, any methodology can be used for its generation. For example, initial structure system 40 could generate initial logical structure 34 in a highly expanded format. For example, initial structure system 40 could expand thirty levels. Conversely, initial logical structure 34 could be generated with a minimal level of expansion. For example, initial structure system 40 could only expand two levels. Still yet, it could be the case that initial logical structure 34 is provided as input in lieu of or in combination with data items 14. Alternatively, initial logical structure 34 could have been previously prepared and stored in storage unit 30 or the like. In such a case, initial structure system 40 could merely access storage unit 30 and retrieve initial logical structure 34 for modification.

Regardless, before any logical structure is displayed for user 16, pattern recognition system 42 will first examine data items 14 or the nodes of initial logical structure 34 (if utilized) for a predefined pattern among the data items 14. One example of a predefined pattern for which data items 14 or nodes can be examined is recursiveness, which will be shown in greater detail in the illustrative examples set forth below. Another type of predefined pattern for which data items 14 or nodes can be examined is some type of predictable pattern of appearance among data items 14 or nodes (e.g., the same data items/nodes keep appearing in a certain order).

Once the predefined pattern is known, list generation system 44 will add particular nodes to a list based on the predefined pattern. For example, assume in an illustrative embodiment that that the predefined pattern for which data items 14 or nodes are examined is recursiveness. In such a case, once the recursive hierarchical descendants of a certain data item are known, the particular node that corresponds to the that data item will be added to a list of recursive nodes by list generation system 44. For example, assume the following logical structure that is based on two data items/nodes, namely, A and B that form a recursive pattern:

A (Stage I)
| - A*
+ - B (Stage II)
  |- A*
  +- B*

As can be seen, the recursive hierarchical descendants of node A are nodes A and B. Similarly, the recursive hierarchical descendants of node B are also nodes A and B. Under the present invention, once node A was expanded at Stage I to reveals its hierarchical descendants as nodes A and B, node A would be added to the list by list generation system 44. Then, when node B was expanded at Stage II to reveal its hierarchical descendants as nodes A and B, it would also be added to the list by list generation system 44. As nodes are added, the list will be used by structure generation system 46 to generate logical structure 18 so that hierarchical descendants of the particular nodes in the list will be automatically displayed only a single time. Thus, if initial logical structure 34 is utilized, structure generation system 46 will automatically modify (e.g., contract or expand) initial logical structure 34 for display to user 16 (i.e., as logical structure 18).

As indicated above, recursive nodes such as those shown above can lead to an infinite logical structure. For example, the nodes in the above diagram with an (*) could have been expanded to reveal additional hierarchical descendants. With recursiveness among the nodes such as this, such expansion could go on indefinitely. Accordingly, a way to truncate initial logical structure 34 to make it more suited for display is needed. To this extent, structure generation system 46 will provide a logical structure 18 (e.g., modify initial logical structure 34) whereby the number of nodes displayed is governed by the following formula (assuming a logical structure of N data items that each has N data items as children):

$$f(N)=N*N+1$$

This formula of the present invention enforces a rule provided hereunder stating that any node in the list is automatically expanded only once so that its hierarchical descendants will be shown in logical structure 18 only a single time. Thus, the present invention ceases automatic expansion at the recursive ancestors. Any further expansion desired by user 16 can be performed manually. The formula currently employed by at least one related art method is as follows:

$$f(N) = 1 + \sum_{i=1}^{N-1} \frac{N!}{i!}$$

This formula ceases expansion at the hierarchical descendant level and is in sharp contrast to the formula of the present invention where automatic expansion is ceased at the recursive hierarchical ancestor level. The related art formula produces greatly different results than the formula of the present invention. Specifically, comparing these two formulas, the following results are produced:

| N | RELATED ART FORMULA | PRESENT INVENTION FORMULA |
| --- | --- | --- |
| 2 | 5 | 5 |
| 3 | 16 | 10 |
| 4 | 65 | 17 |
| 5 | 326 | 26 |
| 6 | 1,957 | 37 |
| 7 | 13,700 | 60 |
| 8 | 109,601 | 65 |
| 9 | 986,410 | 82 |
| 10 | 9,864,101 | 101 |

As can be seen, the difference in the quantity of nodes that will be automatically depicted in the logical structure displayed to user 16 becomes apparent as soon as N=3 or greater. For example, when N=3, the related art formula automatically produces a logical structure having sixteen nodes, while the formula of the present invention automatically produces a logical structure having only ten nodes. This difference becomes more severely pronounced as N becomes greater. For example, when N=10, the related art formula will produce a logical tree having 9,864,101 nodes, while the present invention will product a logical structure having only 101 nodes. Assuming each node consumes 100 KB of memory, when N=10, the related art formula will require 0.98 GB of memory. Conversely, the formula of the present invention will require only 101 KB of memory. Thus, not only will the present invention provide a logical structure that is more useable, but also one that consumes less memory.

Precisely how structure generation system 46 modifies initial logical structure 34 will depend on the format in which initial logical structure 34 is provided. For example, if initial logical structure is expanded beyond the level dictated by the formula and corresponding rule, structure generation system 46 will automatically contract initial logical structure 34 for display based on the list so that the hierarchical descendants of the nodes in the list are displayed only a single time. Conversely, if initial logical structure 34 is generated with less expansion than provided under the formula and rules of the present invention, structure generation system 46 will automatically expand initial logical structure 34 for display so that the hierarchical descendants of the nodes in the list are displayed only a single time. Once a compliant logical structure 18 has been provided (e.g., initial logical structure 34 has been modified in accordance with the present invention), structure display system 48 will render/display logical structure 18 to user 16 who can then make any manual expansions and/or contractions he/she desires.

It should be understood that in certain situations, such as when the quantity of nodes is low, it may be desired for user 16 to see logical structure 18 in accordance with the related art method. To accommodate such situations, structure generation system 46 could optionally be programmed with multiple formulas (e.g., the related art and the present invention formulas) to be used in different situations such as based on the quantity of nodes at issue. For example, when the quantity of data items and/or resulting nodes is below a certain threshold (e.g., 3 or 4), structure generation system 46 could provide a logical structure in accordance with the related art method. When the threshold is exceeded, structure generation system 46 could be programmed to utilize the formula and methodology of the present invention.

ILLUSTRATIVE EXAMPLES

In any event, the methodology of the present invention will be more clearly shown and contrasted against the related art methodology in conjunction with the illustrative examples shown in FIGS. 2-5.

Figure 2:
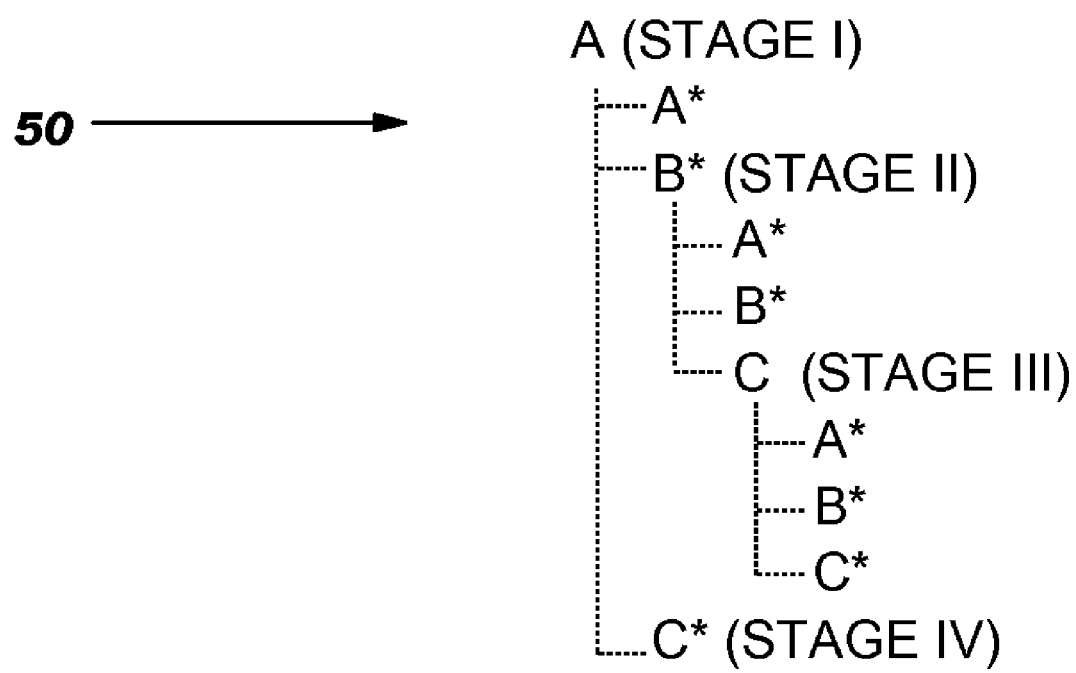
FIG. 2 depicts a first illustrative logical structure generated according the present invention.

Referring first to FIG. 2, a logical structure 50 as modified in accordance with the present invention is shown. As depicted, logical structure 50 is comprised of three recursive and cross-referenced nodes, namely, nodes A, B and C. Referencing the chart depicted above, three recursive nodes will result in a total of ten displayed nodes being automatically displayed under the present invention (as depicted in FIG. 2). To accomplish this, nodes will be added to a list as discussed above. Specifically, at Stage I, the hierarchical descendants of node A were revealed (e.g., nodes A and B). At that point node A would be added to the list. At stage II, the hierarchical descendants of node B were revealed (e.g., nodes A, B and C) causing node B to be added to the list. As indicated above, any nodes in the list will not be expanded when they subsequently appear in the logical structure 50. This is why node A was not expanded again when revealed after Stage I, and is why node B was not expanded again when it appeared after Stage II. For example, even though nodes A, B and C were all revealed when node B was expanded at Stage II, only node C was expanded, which is Stage III in FIG. 2. At that point, since the Stage III expansion caused the hierarchical descendants of node C to be revealed (e.g., nodes A, B and C), node C would be added to the list. Thereafter, any other times node C is revealed (e.g., such as at Stage IV), it will not be expanded.

Figure 3:
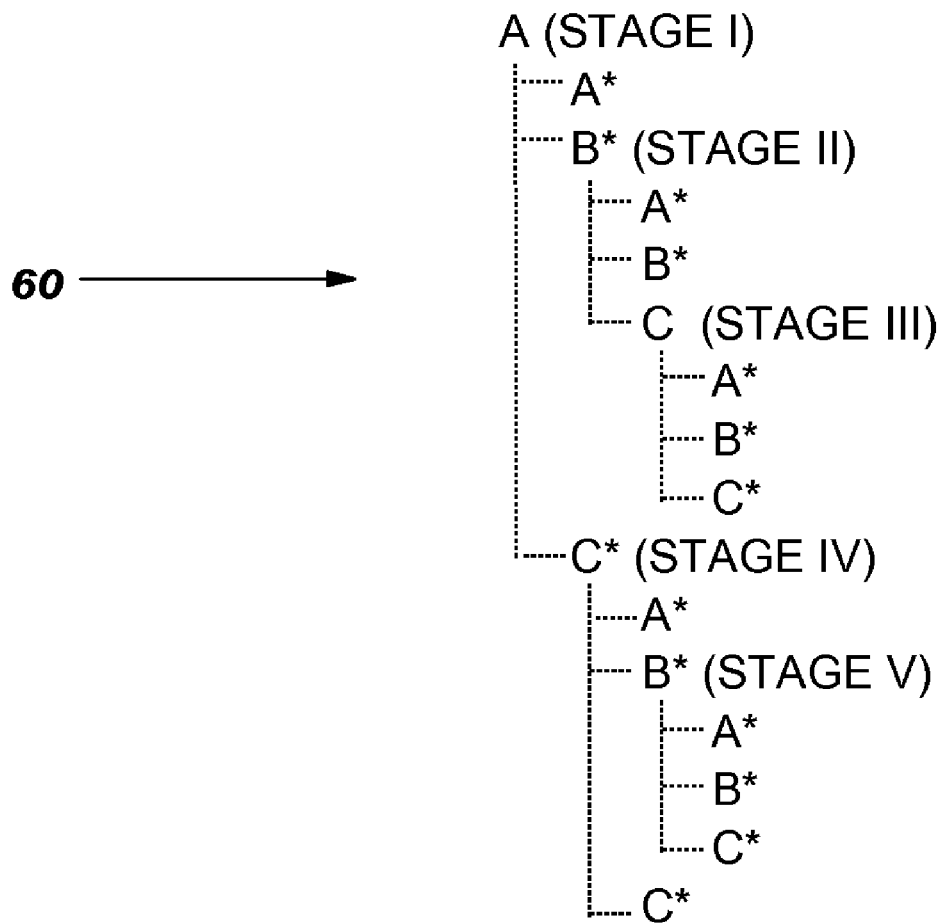
FIG. 3 depicts a first illustrative logical structure generated according to the prior art.

This result can be contrasted against the related art methodology, which is demonstrated in FIG. 3. As mentioned above, the related art method ceases expansion at the hierarchical descendant level (i.e., after hierarchical descendants are repeated) instead of at the hierarchical ancestor level like the present invention. Thus, even though their hierarchical descendants were already known, node C was expanded at Stage IV and node B was expanded at Stage V. This type of expansion provided by the related art method causes logical structure 60 to be displayed with sixteen nodes (as opposed to with ten nodes as provided by the present invention).

Figure 4:
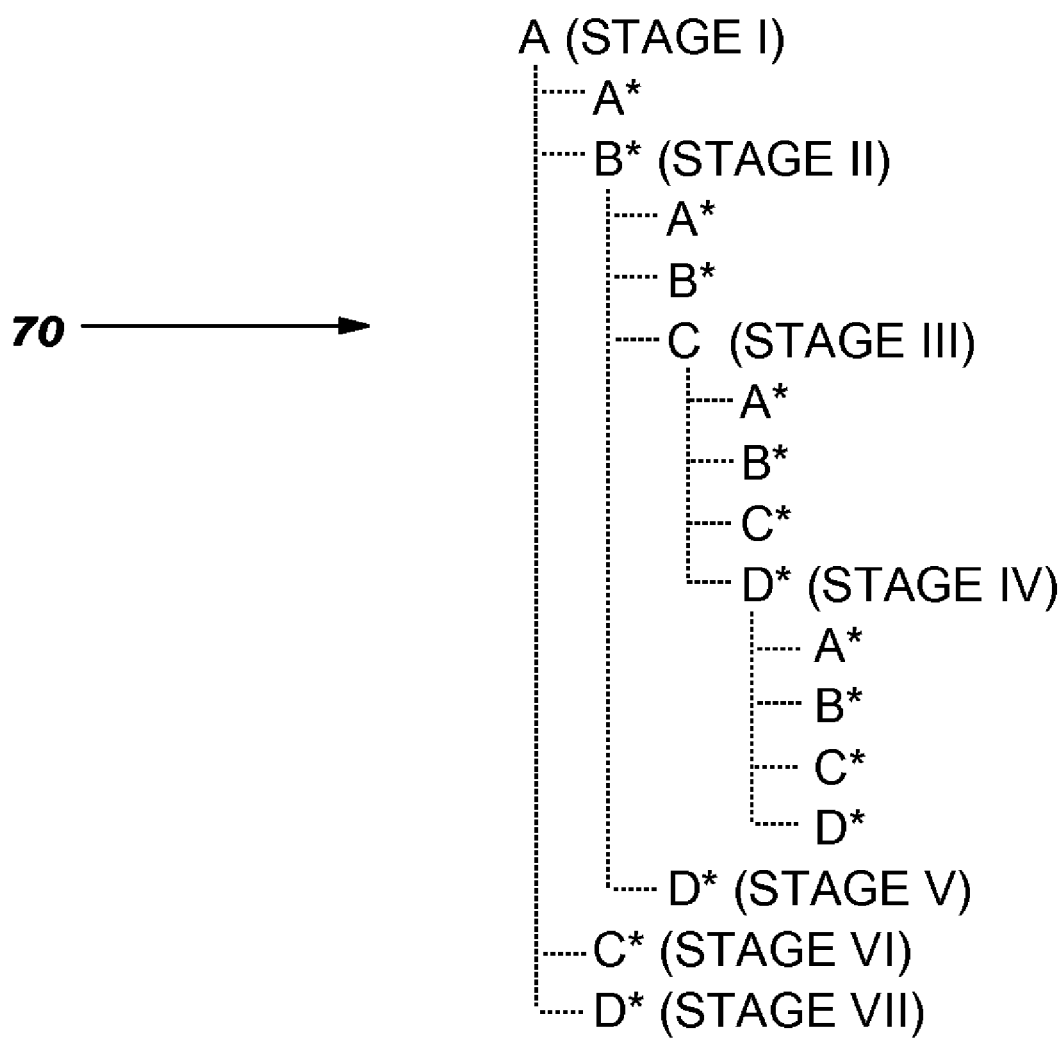
FIG. 4 depicts a second illustrative logical structure generated according the present invention.

This distinction becomes even more pronounced as the quantity of nodes increases. Referring now to FIG. 4, a logical structure 70 according to the present invention that has four nodes A, B, C, and D is shown. Referencing the chart depicted above, four recursive nodes will result in a total of seventeen displayed nodes being automatically displayed under the present invention. Similar to FIG. 2, the hierarchical descendants of nodes A, B and C were revealed at Stages I, I and III, respectively. Accordingly: at Stage I, node A would be added to the list; at Stage II, node B would be added to the list; and at Stage III node C would be added to the list. Furthermore, at Stage IV, node D was expanded to reveal its hierarchical descendants (e.g., nodes A, B, C, and D). Thus, at Stage IV, node D would be added to the list. As described above, once a node is added to the list, it will not be further expanded in logical structure 70. Thus, after Stage I, node A would not be expanded, after Stage II node B would not be expanded, after Stage 3 node C would not be expanded, and after Stage IV node D would not be expanded. For example, it can be seen that node D was not expanded at Stages V and VII, while node C was not expanded at Stage VI.

Figure 5:
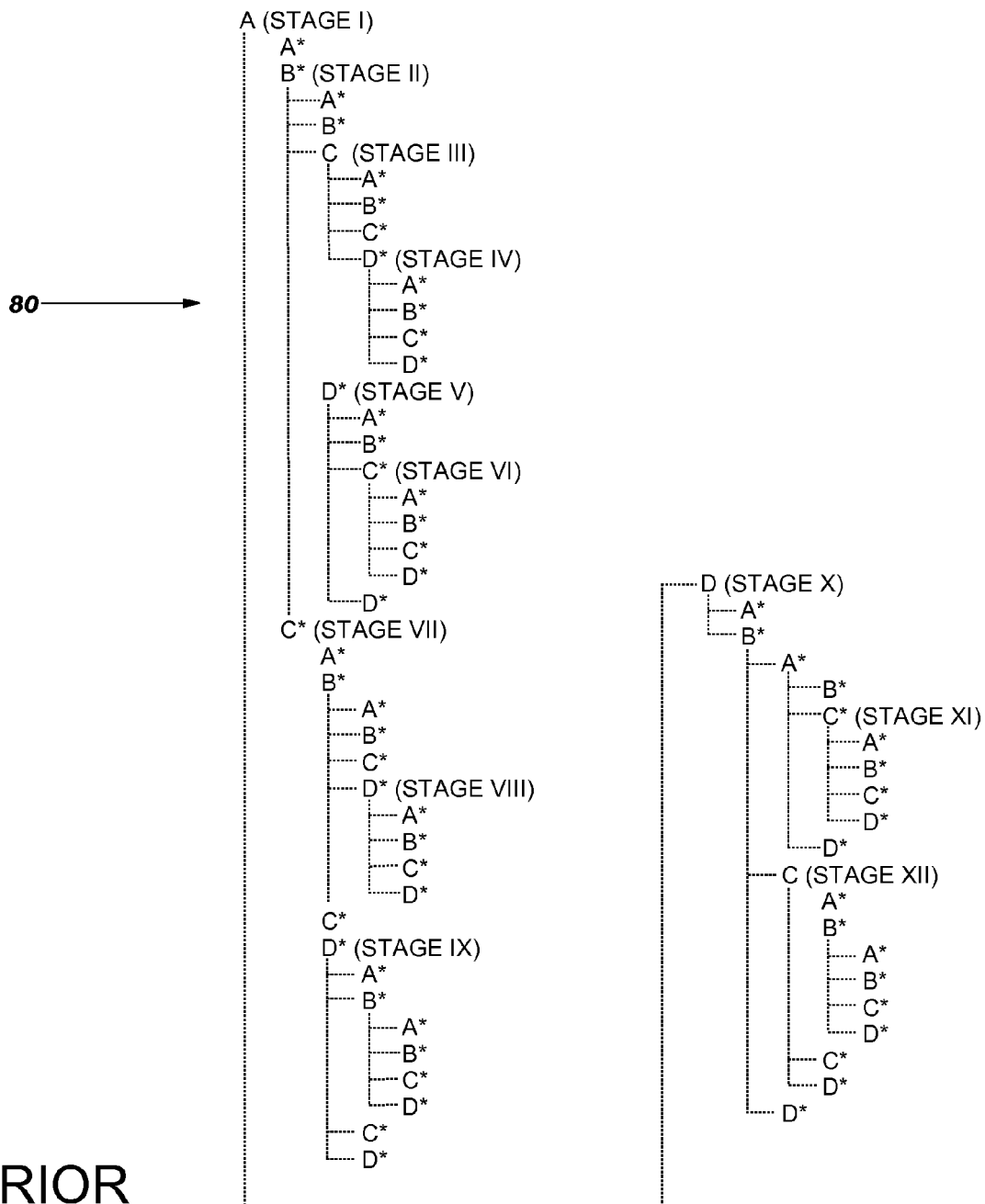
FIG. 5 depicts a second illustrative logical structure generated according to the prior art.

Referring lastly to FIG. 5, the same four nodes are rendered into a logical structure 80 in accordance with the related art methodology. Under the related art formula, a total of 65 nodes would be displayed. Specifically, expansion ceased at the hierarchical descendant level, which caused the same hierarchical descendants to be repeated multiple times. For example, node C was expanded to reveal its hierarchical descendants at Stages III, VI, VII, XI and XII. Moreover, node D was expanded to reveal its hierarchical descendants at Stages IV, V, VIII, IX and X. Such redundancy is not necessary to display to a user. Rather, the user could easily recognize the pattern once he/she saw the relationships a single time. If the user then desired further expansion/contraction of the logical structure, the user could do so manually.

It should be appreciated that the teachings of the present invention could be offered as a business method on a subscription or fee basis. For example, computer system 12 of FIG. 1 could be created, maintained, supported and/or deployed by a service provider that offers the functions described herein for customers. That is, a service provider could offer to generate and display a logical structure of nodes as described above.

It should also be understood that the present invention can be realized in hardware, software, a propagated signal, or any combination thereof. Any kind of computer/server system(s)—or other apparatus adapted for carrying out the methods described herein—is suited. A typical combination of hardware and software could be a general purpose computer system with a computer program that, when loaded and executed, carries out the respective methods described herein. Alternatively, a specific use computer, containing specialized hardware for carrying out one or more of the functional tasks of the invention, could be utilized. The present invention can also be embedded in a computer program product or a propagated signal, which comprises all the respective features enabling the implementation of the methods described herein, and which—when loaded in a computer system—is able to carry out these methods. Computer program, propagated signal, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the configuration of generation system 32 of FIG. 1 is intended to be illustrative only. To this extent, initial structure system 40 and structure generation system 46 could be combined into a single system.

We claim:

1. A computer implemented system for displaying a logical structure, comprising:

processing unit and memory;

a pattern recognition system for examining a set of data items to identify a predefined pattern, wherein the predefined pattern represents data items arranged in a certain order within a hierarchical tree;

a list generation system for adding particular nodes to a list, wherein each node corresponds to the set of data items represented by the predefined pattern; and a structure generation system for generating a logical structure of nodes for display based on the list, wherein the logical structure depicts relationships between data items, and wherein hierarchical descendants of the particular nodes in the list will be automatically displayed only a single time, wherein the predefined pattern comprises a recursiveness among the hierarchical descendants in the set of data items, wherein an initial logical structure of nodes is modified by the structure generation system to prevent recursive hierarchical descendants of the particular nodes from being automatically displayed multiple times, wherein the structure generation system either automatically expands or automatically contracts an initial logical structure of nodes for display based on the list, wherein the hierarchical descendants of the particular nodes in the list are displayed only a single time, and wherein the structure generation system automatically modifies an initial logical structure of nodes so that the hierarchical descendants of the particular nodes in the list can be automatically displayed multiple times if a quantity of the set of data items is below a predetermined threshold.

2. The system of claim 1, wherein the predefined pattern comprises a predictable pattern of appearance of the set of data items.

3. The system of claim 1, further comprising a structure display system for displaying the logical structure of nodes after the logical structure of nodes is generated.

4. A computer program product stored on a computer readable storage medium for displaying a logical structure, which when executed, comprises:

program code for examining a set of data items to identify a predefined pattern, wherein the predefined pattern represents data items arranged in a certain order within a hierarchical tree;

program code for adding particular nodes to a list, wherein each node corresponds to the set of data items represented by the predefined pattern; and program code for generating a logical structure of nodes for display based on the list, wherein the logical structure depicts relationships between data items, and wherein hierarchical descendants of the particular nodes in the list will be automatically displayed only a single time, wherein the predefined pattern comprises a recursiveness among the hierarchical descendants in the set of data items, and wherein an initial logical structure of nodes is modified by the program code for generating to prevent recursive hierarchical descendants of the particular nodes from being automatically displayed multiple times, wherein the program code for generating either automatically expands or automatically contracts an initial logical structure of nodes for display based on the list, wherein the hierarchical descendants of the particular nodes in the list are displayed only a single time, and wherein the program code for generating automatically modifies an initial logical structure of nodes so that the hierarchical descendants of the particular nodes in the list can be automatically displayed multiple times if a quantity of the set of data items is below a predetermined threshold.

5. The program product of claim 4, wherein the predefined pattern comprises a predictable pattern of appearance of the set of data items.

6. The program product of claim 4, further comprising a program code displaying the logical structure of nodes after the logical structure of nodes is generated.

7. A system for deploying an application for displaying a logical structure, comprising:

a computer infrastructure being operable to:

examine a set of data items to identify a predefined pattern, wherein the predefined pattern represents data items arranged in a certain order within a hierarchical tree;

add particular nodes to a list, wherein each node corresponds to the set of data items represented by the predefined pattern; and generate a logical structure of nodes for display based on the list, wherein the logical structure depicts relationships between data items, and wherein hierarchical descendants of the particular nodes in the list will be automatically displayed only a single time, wherein the predefined pattern comprises a recursiveness among the hierarchical descendants in the set of data items, and wherein an initial logical structure of nodes is modified by the program code for generating to prevent recursive hierarchical descendants of the particular nodes from being automatically displayed multiple times, wherein the program code for generating either automatically expands or automatically contracts an initial logical structure of nodes for display based on the list, wherein the hierarchical descendants of the particular nodes in the list are displayed only a single time, and wherein the program code for generating automatically modifies an initial logical structure of nodes so that the hierarchical descendants of the particular nodes in the list can be automatically displayed multiple times if a quantity of the set of data items is below a predetermined threshold.

8. Computer software embodied in a physical recordable medium for execution by a computer to display a logical structure, the computer software comprising instructions to cause a computer system to perform the following functions:

examine a set of data items to identify a predefined pattern, wherein the predefined pattern represents data items arranged in a certain order within a hierarchical tree;

add particular nodes to a list, wherein each node corresponds to the set of data items represented by the predefined pattern; and generate a logical structure of nodes for display based on the list, wherein the logical structure depicts relationships between data items, and wherein hierarchical descendants of the particular nodes in the list will be automatically displayed only a single time, wherein the predefined pattern comprises a recursiveness among the hierarchical descendants in the set of data items, and wherein an initial logical structure of nodes is modified by the program code for generating to prevent recursive hierarchical descendants of the particular nodes from being automatically displayed multiple times, wherein the program code for generating either automatically expands or automatically contracts an initial logical structure of nodes for display based on the list, wherein the hierarchical descendants of the particular nodes in the list are displayed only a single time, and wherein the program code for generating automatically modifies an initial logical structure of nodes so that the hierarchical descendants of the particular nodes in the list can be automatically displayed multiple times if a quantity of the set of data items is below a predetermined threshold.

* * * * *